Dec. 11, 1962  W. R. MOBLEY  3,067,877
MEANS AND METHOD FOR THE AUTOMATIC SEPARATING
AND PURIFYING OF LIQUIDS OF DIFFERENT
SPECIFIC GRAVITIES
Filed Sept. 21, 1954  3 Sheets-Sheet 1

INVENTOR.
William R. Mobley.
BY
Golrick & Golrick
ATTORNEYS

Dec. 11, 1962 W. R. MOBLEY 3,067,877
MEANS AND METHOD FOR THE AUTOMATIC SEPARATING
AND PURIFYING OF LIQUIDS OF DIFFERENT
SPECIFIC GRAVITIES
Filed Sept. 21, 1954 3 Sheets-Sheet 2
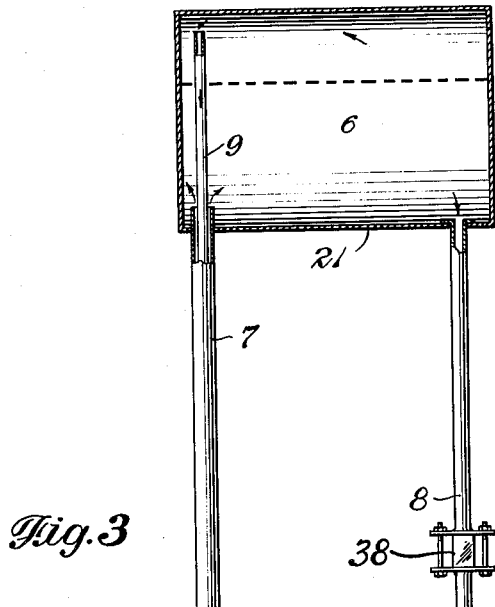
Fig. 3
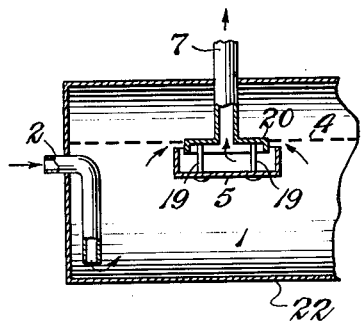
Fig. 4
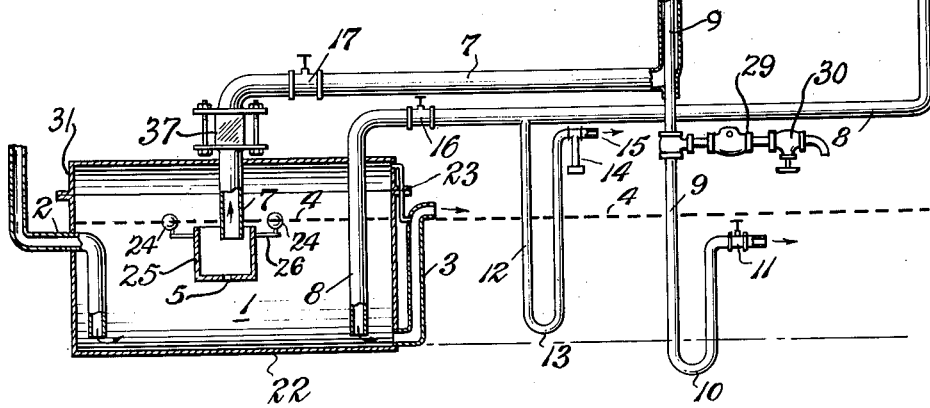
INVENTOR
William R. Mobley.
BY Gohrick & Gohrick
ATTORNEYS Dec. 11, 1962  W. R. MOBLEY  3,067,877
MEANS AND METHOD FOR THE AUTOMATIC SEPARATING
AND PURIFYING OF LIQUIDS OF DIFFERENT
SPECIFIC GRAVITIES
Filed Sept. 21, 1954  3 Sheets-Sheet 3
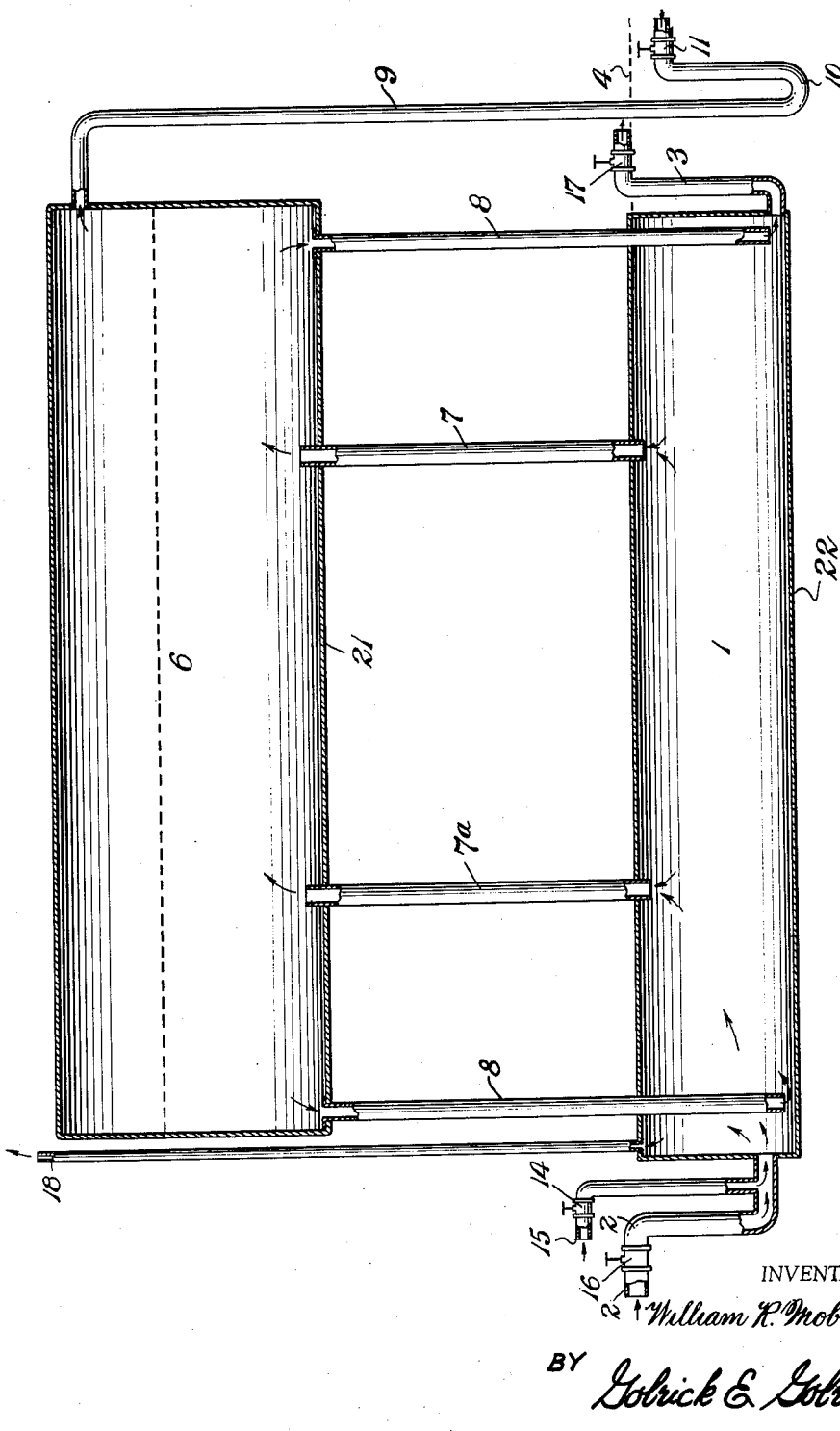
INVENTOR
William R. Mobley.
BY Golrick & Golrick
ATTORNEYS United States Patent Office 3,067,877
Patented Dec. 11, 1962

3,067,877
MEANS AND METHOD FOR THE AUTOMATIC SEPARATING AND PURIFYING OF LIQUIDS OF DIFFERENT SPECIFIC GRAVITIES
William R. Mobley, Miami, Fla.
Filed Sept. 21, 1954, Ser. No. 457,373
12 Claims. (Cl. 210—83)

This invention relates to a low pressure automatic method of separating immiscible liquids of different specific gravities and means for practicing the method and the subject matter comprises a continuation-in-part of the subject matter of my application Serial Number 161,347 filed May 11, 1950, now abandoned.

In my prior application I have disclosed a system of continuous flow and continuous separation of the liquids by the use of two tank structures so positioned and interconnected that one tank is located above the other tank with the liquid contents of the lower tank disposed under atmospheric pressure to maintain a hydrostatic column extending into the upper tank wherein a negative, i.e. less than atmospheric, pressure is maintained, while a trapped discharge line extends downwardly to discharge the lighter separated liquid automatically from the upper tank.

In the present disclosure the general arrangement as above described is incorporated in apparatuses which are adapted to separate two or more liquids of different specific gravities; the liquid having the least specific gravity being discharged from the system while the other liquid or liquids is or are discharged in unison, the particular application being to the separation of greases and oils from an effluent of process equipment or the like which also contains emulsions of detergents and greases and oils. In the petroleum industry my system can be utilized in the separation of heavier impurities from crude petroleum thereof as will be explained.

The general object of my invention therefore is to automatically separate heavier and lighter liquids in a negative pressure environment and automatically discharge the separated liquids from separate outlets in amounts substantially equal to the amount of each liquid contained in the influent stream admitted into the system.

A further object of the present invention is the provision of a method of separating mixed liquids of different specific gravities and discharging the same automatically while the effluent flows either continuously or intermittently into the system.

A more specific object of the present invention is the provision of apparatus which will automatiaclly separate heavier and lighter liquids from a mixture thereof, the separation being accomplished in stages in which a primary separation is effected under conditions of prevailing atmospheric pressure and secondary or final separation is effected under conditions of relatively lower pressure; the apparatus being such that the separated liquids can be separately discharged from the apparatus while said relatively low or negative pressure is maintained on the lighter separated liquids and the liquid mixture in the process of separation.

A further object of the present invention is the provision of a method of and apparatus for the separation from an effluent of mixed heavier and lighter liquids and intermediate emulsions of the lighter and heavier liquids whereby the water and impurities separated from the emulsions may be discharged to the discharge outlet of the heavier separated liquid while the lighter separated liquid is retained.

Another object is the provision of separating apparatus wherein the length or height of the light liquid discharge line can be increased or decreased relative to the heavy liquid discharge line to balance the weight of the head of the liquid mixture in the negative pressure separating chamber thereby to maintain a sufficient head of the lighter and heavier separated liquids above and below separated emulsion of the two liquids, and whereby the automatic discharge of the emulsions with the automatic discharge of either of the separated liquids is prevented.

A further object of the present invention is the provision of means for fulfilling the foregoing stated objects, which is adaptable to the conversion of existing grease and oil separators or interceptors to operation under my system.

Other objects of my invention will become apparent to those skilled in the art from the following description referring to the accompanying drawings showing three different embodiments thereof. The essential characteristics are summarized in the claims. That the following description and the claims may be clearly understood, it is to be noted that immiscible constituents having different specific gravities of an influent stream coming into the process or apparatus described are to be separated; and accordingly where mixtures or a mixture of heavy and light liquids is discussed, a heterogeneous mixture is intended, as for example, in the case of oil and water, or a salt water solution and oil, or as may in some cases occur, a water-oil emulsion which may separate as an emulsion layer from say water.

In the drawings, FIG. 1 shows in vertical cross section a two tank system incorporating features of my invention;

FIG. 3 illustrates a second embodiment of my invention adapted to the separation of lighter and heavier liquids and emulsions thereof;

FIG. 4 is a fragmentary section showing a modification of a skimmer means used in FIG. 3; and FIG. 5 illustrates a third embodiment directed to the separation of water and the heavier impurities from crude petroleum.

Figure 1:
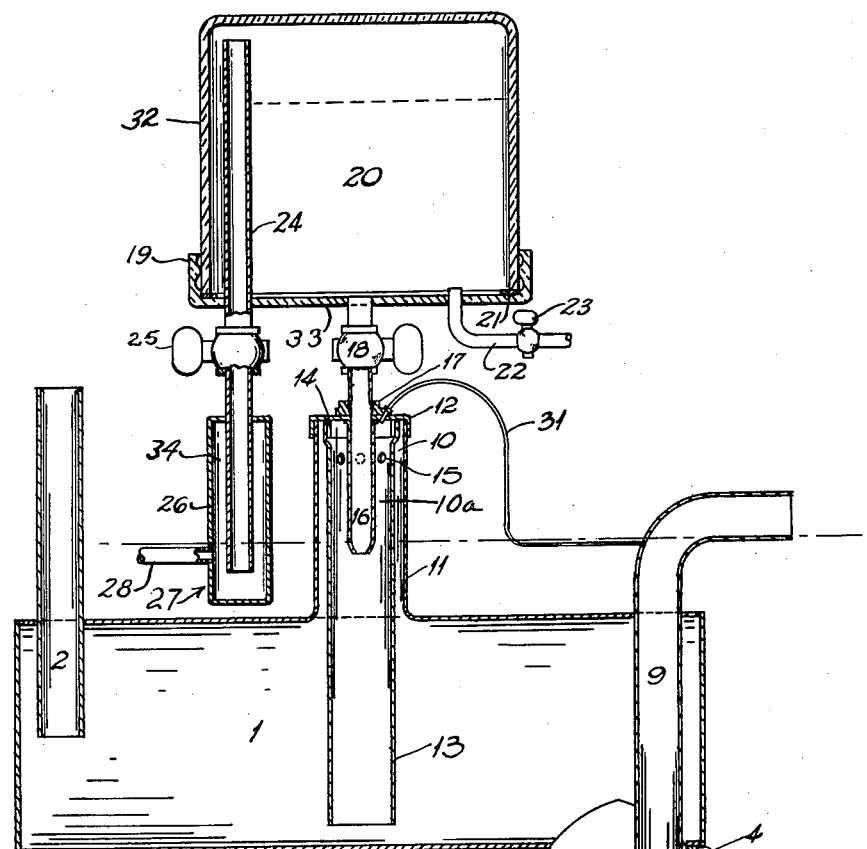

Referring now in detail to the drawings, and first to that form of the invention illustrated in FIGURE 1, the numeral 1 represents a tank the top of which should preferably be level and provided with a dome constituted by the tube 11 and the cap closure 12. An inlet pipe 2 is shown entering the tank at the top and extending downward so that its lower end is submerged. A discharge pipe 9 also enters the tank at the top, and as shown, its lower end extends below the bottom of said tank through an opening therein into a removable sump 3. The sump 3 is of conventional construction, being transparent and secured by a swinging bail 5 having a screw 6 threaded into a nut 7 carried by the under part of the bail. The screw may be tightened against the sump for holding it in place. The joint between tank 1 and sump 3 is sealed by a gasket 4. The purpose of the sump is, of course, to catch non-buoyant particles which may enter the tank 1.

The upper end of the discharge pipe 9 extends above the top of the tank 1, being formed with an elbow, the bottom of the horizontal limb of which is in a horizontal plane that intersects the dome 11 at a point intermediate the height of said dome, and this bottom determines the static level of liquid in said dome.

The tank 1 is initially primed by filling it with water until the water discharges from the pipe 9. Throughout the specification, water will be referred to as the heavier liquid, while the lighter liquid will be referred to as grease and oil, although it is to be understood that these two liquids have been selected simply for convenienc in description, and that the apparatus is adapted to separate any two mutually insoluble liquids having different specific gravities.

A tube 13 of smaller diameter than the dome extends throughout the dome coaxially therewith, being secured to the dome cap closure 12 and terminating a short distance from the bottom of the tank. An annular chamber 10 is thus formed between the dome and tube 13, which is in communication with the tube 13 through a circumferential series of apertures 15 formed in the wall of the tube 13 at a short distance below the cap closure 12. When the tank has been primed, the water stands at the static level within the tube 13 as well as in the annular chamber of the dome. A closed tank 20, mounted above the tank 1, comprises a receptacle 32, which may be transparent and removably secured to a flanged base 33. As shown, said receptacle is screwed to the peripheral flange 19 of the base plate against a sealing washer 21. A tube 16 secured to the base of and communicating with the tank 20, passes through the cap closure 12 so that its lower open end extends a short distance below the static level of the tank 1. As the tube 16 is secured to the fitting 17 forming part of the cap closure 12, in the illustrative embodiment it serves as the means for mounting the tank 20. The tube 16 is smaller in diameter than the tube 13, providing an annular space 10a between itself and the tube 13.

The tank 20 is provided with a discharge line 24, which leads downward through the base 33 and has its upper end terminating below the top of the tank 20 and its lower end extending some distance downwardly below said base 33 to a point below the static liquid level in the lower tank outlet 9. A sliding trap 27 surrounding the lower portion of the tube 24 can be slidably moved axially of the tube 24 to increase or decrease its effective length. The trap 27, as shown, consists of a cylindrical casing 34 into which the lower end of the tube 24 opens, casing 34 being of larger diameter than the said tube, and being provided with a discharge pipe 28. A water supply pipe 22 extends through the base 33, communicating with the tank 20 near the bottom thereof. This supply pipe is connected to a source of water under pressure (not shown). The tubes 16, 24 and the water supply pipe 22 are provided with the respective stop cocks 18, 25 and 23.

The tank 20 is initially primed, that is, filled with water. This is accomplished by first closing the stop cock 18, opening the stop cock 25, and then opening the stop cock 23 to admit water. The entering water displaces air from the chamber of the tank 20, which discharges through the tube 24, trap 27 and discharge pipe 28 until the water reaches the level of the upper end of the tube 24. Further admission of water entrains the air which is left in the top of the tank 20, and this air is discharged with water through the tube 24. After the tank 20 has been filled with water, the stop cock 18 is opened to let water fill the tube 16, displacing the air which bubbles up and is entrained in the water discharging through the tube 24. After the entire trapped system has thus been filled with water, the stop cocks 23 and 25 are closed.

With the system in this primed condition, there is a continuous water column filling the tube 13, the tube 16, and the tank 20. The lower part of said column is under atmospheric pressure through either or both of the pipes 2 and 9, so that the body of water in the tank 20 is sustained by atmospheric pressure. The pressure at the top of the tank 20 is therefore equal to atmospheric pressure less the weight of the head of water extending from the top of said tank down to the static level of the tank 1. This pressure is what is referred to as the negative or relatively low pressure.

In the further description or functioning of the apparatus, it will be understood that the complete separation of one liquid from another is a process of settling out, and that while two liquids of different specific gravities may at once separate when the body of the mixed liquids is quiescent, complete separation is only effected by giving time for intimately mixed portions of the liquids to exchange places gravitationally, so that the top part of the supernatant layer or lighter liquid is always the most perfectly separated. In this invention in order to accomplish as nearly perfect separation as possible, it is desirable that only the top part of the fluent grease shall be admitted to the negative pressure tank 20. It is also a matter of common knowledge that liquids of different specific gravity which are intimately associated as is crude oil with water, separate more completely under low pressure than at high pressure.

In operation, after the system has been primed with water in the manner set forth, a mixture of water and oil or grease is admitted to the tank 1 by way of the inlet pipe 2. An equivalent amount of water is displaced and discharged through the pipe 9. The column formed in tank 1 is sufficiently capacious to permit the body of liquid that it contains to assume a condition of substantial quiescence notwithstanding that the admission of the liquid mixture may be continuous. Initial separation takes place in the column formed in the tank 1, the grease or oil layer rising to the top of the tank and into the annular chamber 10 of the dome 11. Since the grease is lighter than the water, the grease column in the dome chamber 10 will rise to a height above the static level of the tank 1. As more grease accumulates in the top of the tank 1, the column in the dome chamber 10 will rise higher until it reaches the perforations 15, at which point it will be forced over into the tube 13. Any air which may enter the tank 1 with the liquid mixture will rise through the grease column in the dome chamber 10, pass through the perforations 15 with the grease, and rise into the upper part of the tube 13.

In order to prevent an accumulation of air in the upper part of tube 13, an air bleed tube 31 is provided extending through the cap closure 12, communicating with the tube 13 and being connected at its opposite end to the discharge pipe 9 at a point below the static level so that its discharge end is always submerged. This is important, since when liquid is discharging through the elbowed portion of the discharge pipe 9 its depth above the horizontal floor of said elbowed portion will vary so that if the air discharge 31 were connected above the static level, it would be at times exposed to atmosphere and at times submerged, creating pulsation of the air in the upper part of the tube 13, resulting in a surge of the oil and water grease column, mixing the top grease with the underlying grease that has not been so completely purged of water, thus reducing the efficiency of the negative pressure tank in effecting perfect separation.

When the grease or oil column in the dome chamber 10 has reached the perforations 15 and entered the tube 13, further accumulation of grease in the tank 1 and dome chamber fills the upper part of the tube 13 above the perforations 15, which is of inconsequential volume and then forces the grease or oil column downward through the annular space between the tubes 16 and 13 until the grease or oil column extends below the mouth of the tube 16 and occupies the entire cross-section of the tube 13. The buoyancy carries the grease or oil up through the tube 16, through the body of water therein and allows it to collect in a layer at the top of the tank 20 and supernatant with respect to the body of water in said tank. The water displaced by the grease or oil descends through the tube 16, and a corresponding amount of water is discharged through the pipe 9.

Thus it will be understood that as grease accumulates in the top of the tank 1, it is the older grease or oil—that is, the grease or oil which has had the most time to become freed from its impurities and admixtures of water—that ascends through the dome chamber 10 and descends through the tube 13 and enters the negative pressure tank 20.

Grease or oil is permitted to completely fill the tank 20 and the top of the chamber 1 and the water displaced from the tank 20 is discharged through the pipe 9. The valve 25 in the tube 24 is now opened and the adjustable trap 27 is lowered so that the column of grease or oil which it will support balances the head of oil and water in the column of liquid mixture formed in tube 16 and tank 20 at a predetermined level of the water and oil in tank 20, which represents the desired point at which the discharge of grease or oil is to be automatically cut off. Since there is no water in the tank 20 at the beginning of the discharge, the column of fluent grease or oil in the adjusted length of the tube 24 overbalances the head of grease or oil column formed in the tank 20 and tube 16, so that the grease or oil will gravitationally discharge from the column formed in the tube 24, trap 27 and the discharge pipe 28 till balance is reached. As the grease or oil discharges, the water rises in the tank 20, pressed up by atmospheric pressure on the contents of tank 1 until the head of water reaches such a height in tank 20 that the head of water and grease is equal the weight of the column of grease in the tube 24, at which time the discharge of grease ceases. The valve 25 and the separating column may be closed and opened at intervals during that period in which the water level in tank 20 is below the level determined by the adjusted length of the tube 24 to draw off the accumulated grease, or it may be left open for continuous operation. When continuous operation is desired, the length of the tube 24 should be adjusted so that the rate of discharge will not exceed the rate of separation.

While I have disclosed the trap at the bottom of the tube 24 as being adjustable, it is within the purview of the invention to substitute a fixed trap which may be of a goose neck type or any known type to make the tube 24 and trap of a fixed length determined with respect to the separating capacity of the apparatus with which it is employed.

Figure 2:
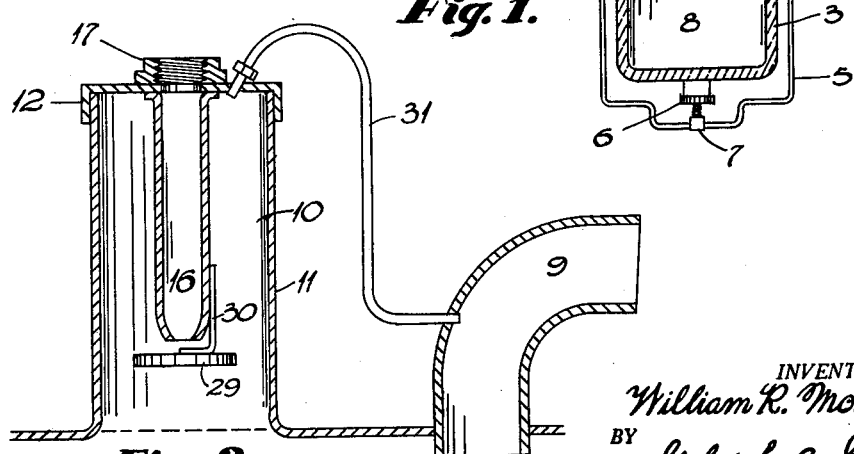
FIG. 2 is an enlarged cross section of a modification of part of the apparatus shown in FIG. 1.

That form of the invention illustrated in FIGURE 2 distinguished from the form shown in FIGURE 1 solely in the omission of the tube 13 and the substitution of a horizontal baffle 29 fixed to the tube 16 by a support 30 and spaced from the mouth of the tube 16 so as to block the direct entrance of air into the tube 16. The construction shown in FIGURE 2 has the disadvantage that the earlier accumulated grease or oil in the dome chamber 10 entrains some of the later accumulated grease ascending into the dome chamber, so that the grease that passes through the tube 16 into the negative pressure tank 20 is not as thoroughly processed as that which enters the tank 20 in the first disclosed form of the apparatus.

The form of the invention shown in FIGS. 3 and 4 is an extension and adptation to the separation of more than two mixed liquids such as is encountered in the well known industrial and commercial forms of grease and oil separators used to prevent the ingress of greases and oils to sanitary systems terminating in sewage disposal plants. Here the apparatus is adapted to operate in conjunction with such interceptors to separate the effluent comprising waste water, greases and oils and emulsions of these liquids.

A problem arises, for instance in the use of interceptors connected to sinks and dish washers, in that the detergents used form an emulsion of the water and the greases and oils. The function of the apparatus shown in FIG. 3 is to effect separation of the water, the unemulsified greases and oils and the emulsions in such manner they may be disposed of separately after separation. Under flowing action the emulsions brought about by the use of detergents tend to entrain part of the greases and oils which are not emulsified. I find that the specific gravity of the emulsions is greater than the greases and oils but definitely less than the water. I also have found that by separating the emulsions and greases and oils from the influent liquid mixture and isolating them under a negative pressure environment the entrained greases and oils in the emulsions will separate and be buoyant when a time lag is afforded.

In FIG. 3 I show a grease and oil interceptor 1 which in construction may be of any suitable commercial construction with a trapped inlet line 2 at one end and a trapped outlet line 3, the height of which determines the normal water level 4 within the separator 1. These interceptors are usually rectangular in shape and are closed by a removable lid or top to form a gas tight chamber 1 in which the separated greases and oils collect as the influent liquid passes through the interceptor. An air by-pass 23 is usually incorporated in such interceptors to afford escape of air, carried into the separating chamber, to the outlet 3. This by-pass also prevents surging within the chamber when the discharge end is trapped below the static level as shown.

In applying my apparatus to such a separator the lid of the latter is replaced with a lid 31 through which passes a riser line 7 and a downflow line 8. The line 7 has a valve 17 and line 8 a valve 16 for a purpose to be explained. These two lines extend upwardly to a negative pressure tank 6 of any convenient shape. The riser line 7 terminates within the tank 6 above the bottom of the tank chamber and the downflow line 8 terminates in the bottom of tank 6. The lower end of line 8 terminates preferably adjacent the bottom of the interceptor 1 and near the outlet trap leg 3. The bottom of the riser pipe terminates below the normal liquid level 4 and within a skimmer mechanism hereinafter described. An air vent or by-pass 23 is provided between the top of the chamber 1 and the outlet leg 3 in a known manner to prevent air entrapment in chamber 1.

A grease and oil discharge column or line 9 descends from adjacent the top region of the negative pressure chamber 6, preferably through the riser pipe 7, and terminates in a trap leg 10 disposed below the bottom 22 of the interceptor tank 1. A valve 11 controls the downward flow of separated greases and oils from the negative pressure chamber 6. If desired, the discharge line 9 may terminate above the top of the chamber 1 as indicated in FIG. 3, in which event a check valve 29 is provided to prevent the ingress of air into the line 9 when valve 30 is opened. When the automatic discharge of the grease or oil is desired the trap leg 10 would be used and when only intermittent servicing of the low pressure chamber 6 is contemplated the valves 29 and 30 may be used thus avoiding the installation of the trap leg 10 below the floor supporting the interceptor. The manner of effecting draw off through valve 30 will be described later.

The down flow line 8 is provided with an auxiliary trap leg 12—13, a valve 14, and a hose coupling 15 thereby to prime or fill the negative pressure tank and the lines 7 and 8.

As stated the riser line 7 terminates below the normal or static level of the heavy liquid in the separator 1 and in a skimmer or gathering mechanism which is of the float type and buoyed to rise and fall with any variations in the top level of the separated greases and oils and emulsions of the same present in the separating chamber 1. It will be noted in FIG. 3 that a cup shaped member 25 is floated by hollow float balls 24 through a flange 26 on the cup 25 adjacent the top rim of the cup structure. Regardless of the fluctuation in the static level, the mouth of the skimmer floats slightly below the static level and the lightest floating solids, grease and emulsions are continuously skimmed from the surface of the liquid and pass through pipe 7 into the low pressure tank 6. The grease is completely separated from the emulsions and the solids. The separated water, solids and impurities pass down through the line 8.

Occasionally a considerable amount of grease and hot water is admitted to the interceptor causing the surface to be skimmed so rapidly that air accumulates in the mouth of the skimmer causing the mouth to float above the static level which stops the function of the skimmer. Water admitted through the opening 5, causes it to sink and the skimming of the surface again causes continuous circulating of the liquid to and from the tank 6 through the lines 7 and 8. Where the inlet flow does not produce high fluctuation, a rigid skimmer structure such as is shown in FIG. 4 may be used on the lower end of the riser line 7. The cup may be supported on studs 19 depending from a flange 20 on the lower end of the riser 7. I prefer however to use the floating skimmer in interceptors connected to sinks and dish washers.

To prime or condition the system for operation the interceptor chamber 1 is filled with water up to the normal static level as determined by outlet leg 3 and the negative pressure chamber 6 and lines 7 and 8 also are filled with water. To establish the hydrostatic balance between the chambers 1 and 6, the procedure is as follows—

Assuming the water level 4 is established in interceptor 1, valves 16 and 17 are closed, valve 11 is open and the negative pressure tank 6 is charged with water through hose connection 15 and valve 14 until water flows through open discharge line 9. Valve 14 is closed and valves 16 and 17 are then opened and columns 7 and 8 and tank 6 are maintained by atmospheric pressure on interceptor 1 and a negative pressure exists in tank 6. This cycle of valve operation and water charging may be repeated to eliminate possible air entrapment.

The primed system operates as follows in connection with treatment of grease laden influent liquid mixture; the influent flows into the interceptor 1 wherein detergent emulsions are present in the influent. As the burden influent passes through the interceptor from inlet 2 to outlet 3, the free greases and the grease burdened emulsions rise to the top of the water in the separating chamber 1. The float 24 maintains the skimmer cup top rim slightly below the plane of separation of the water and the emulsion layer which is topped by a layer of free greases. Thus the free grease emulsion and floating solids are passed to the bottom opening of the hydrostatic column comprising the riser line 7. Due to the differences between the specific gravities of the water in the column and the free grease and grease burdened emulsion the latter rise in the column and displace an equal volume of the heaviest water from the separating tank 6. The free grease rises to the top of the liquid body in tank 6 and the grease burdened emulsions rise in a layer thereunder. Under the influence of the prevailing negative pressure in tank 6 the emulsion and solids will completely separate. The water and solid impurities will pass to the bottom of the tank 6 into the interceptor through the line 8 and discharge through the line 3. As the influent charges into the interceptor the displacement action on water in tank 6 is repeated and the displaced water passes out of tank 6 downwardly through line 8 where it is discharged into the interceptor chamber adjacent the bottom of the outlet riser 3. When the negative pressure tank 6 becomes filled with separated grease the tank may be emptied by closing valves 16 and 17 and by recharging the tank 6 with water through valve 14 while valve 11 or 30 is open to permit the grease to escape. When it is desired to have the discharge function automatically, trap 10 would be used and the valve 11 would remain open and line 9 would discharge into a receptacle (not shown). Thus a balance of the head of the liquid present in the negative pressure separating chamber 6 is obtained which permits of the automatic discharge through separate lines of the separated greases and oils and the separated residue emulsion with one of the lines being trapped in the lower body of liquid in the interceptor.

It will be noted that I have arranged the grease discharge line 9 within the riser line 7 for the purpose of obtaining heat in line 9 from the warm substances rising in line 7 thereby to maintain fluidity of the heavier greases although the system is operable without this specific arrangement for in many instances the column 9 may be installed independent of the line 7.

It will be seen that in the apparatuses the columns 8 and 9 respectively constitute automatic columns. In the FIG. 1 embodiment the column height relative to the normal static level in the interceptor or in the FIG. 3 apparatus the substantially greater height of column 9 does not interfere with trapping of the same for automatic discharge while columns 7 and 8 are maintained. Also it will be apparent that the primer line 12–13 and 14 may be connected directly to the negative pressure chamber 6 in the FIG. 3 apparatus.

When using the FIG. 3 apparatus if automatic discharge of the separated greases and oils from chamber 6 is not desired, the air check valve 29 and valve 30 may be used at a locus above the bottom of the interceptor 1 by using a primer connection 22 as shown in FIG. 1 or by using the primer connection 12–13–14 in FIG. 3. I may substitute a check valve as shown at 29 for the trap 13 to prevent the ingress of the air to chamber 6.

It will be apparent to those skilled in the art that presently installed interceptors can be converted to any automatic skimmer type by substituting in FIG. 3 a lid or cover 31 therefor which will afford connections for the riser line 7 and return line 8 since the remainder of the equipment can be installed without disrupting the plumbing.

In FIG. 5 of the drawing I show my system as applied industrially to the purifying of crude petroleum. In this instance the major flow volume is the crude petroleum and the impurity primarily is water contained in the crude liquid. As distinguished from the apparatus in FIGS. 1 and 3 the major volume of the separated liquids must pass through the negative pressure chamber while the lesser volume of the separated liquid (water) must pass through the lower separator or interceptor. Referring to FIG. 5, I show a lower tank 1 the contents of which are subject to atmospheric pressure and an upper negative pressure tank 6. An air vent line 18 maintains an atmospheric pressure within lower tank 1. Trapped inlet line 2 and outlet line 3 are connected to the respective ends of tank 1 near the bottom thereof. Riser lines 7 and 7a establish communication between the top region of the lower tank 1 and the lower region of the negative pressure tank 6. Return lines 8 lead down from the bottom of tank 6. Line 8 is located adjacent the ends of tank 6 and terminates adjacent the bottom region of lower tank 1. A priming line having valve 14 and hose coupling 15 is connected to inlet leg 2 between an inlet valve 16 and the tank 1 connection of the inlet leg. A valve 17 is also included in the outlet leg 3 of the tank 1. Connected to an end of the negative pressure tank 6 is a discharge line 9 having a goose neck trap 10 disposed below the bottom 22 of tank 1 (FIG. 5). This trap formation has valve 11 which is normally open.

This system is primed by closing tank valves 16 and 17 while valve 11 is open. Water under pressure passes through connection 15 from a hose and through valve 14 until tank 1 is filled with water. The displaced air from tank 1 passes out through vent 18. The priming is continued until tank 6 is filled, the air passing out of tank 6 through line 9. If desired tank 6 may be vented at its top through an air tight valve which would be closed after tank 6 is primed. After priming, valves 16 and 17 are opened and crude petroleum enters the system through inlet leg 2. The petroleum liquid rises to the top of the water filled tank 1 leaving in the water of tank 1 any entrained sand or other water and solids. The petroleum rises upwardly in lines 7 and 7a and displaces an equal volume of water from tank 6 downwardly through lines 8. The cleansed liquid petroleum rises to the top of negative pressure tank 6 and escapes automatically, continuously or intermittently through line 9. Thus the flow capacity of line 9 should be equal at least to the flow capacity of inlet leg 2. Thus a primary separation takes place in tank 1 and final separation takes place in negative pressure tank 6 and any separated heavier liquids and sediment will flow downwardly back to tank 1 through lines 8 to the bottom of tank 1. The separated heavier liquids and sediment pass out of tank 1 through outlet leg 3, the outlet end of which should be disposed to determine a static water level within tank 1 at about the top thereof. It will be noted that riser pipes 7, 7a extend into tank 1 below the top of the tank a slight distance, so that a layer of petroleum liquid is always present at the top of tank 1; also that the lower ends of downflow lines 8 are disposed respectively adjacent the lower ends of inlet leg 2 and outlet leg 3 thus facilitating the movement of sediment toward the outlet leg 3. If desired the lines 7, 7a and 8 may be valved whereby the lower tank 1 may be flushed free of any sediment from time to time.

In instances where the crude petroleum is heavily burdened with impurities and the water in tank 1 quickly becomes loaded with the impurities, fresh water valve 14 may be regulated to bleed fresh water into tank 1 thereby constantly freshening the water in tank 1 in a continuous flow operation.

From the foregoing description of the FIG. 5 apparatus it will be seen that the process of separation of impurities in crude petroleum can be fulfilled in an automatic continuous or intermittent flow manner and any liberated air or gases carried into the primary separating tank 1 will escape through the vent 18. Any emulsions or petroleum fluids heavier than the crude petroleum will separate and stratify below the crude petroleum passing through the negative pressure tank 6 and together with any sediment will return to the lower tank 1 from which they move toward outlet leg 3 to be eventually carried out of tank 1 through outlet leg 3 with other liquid waste while the washed and separated petroleum liquid flows out of trapped column 9 automatically; the automatic discharge of each of the separated liquids being substantially equal to the amount of each liquid admitted in the mixture.

It will be observed in FIGURES 1, 3 and 5, that the discharge lines for the light liquid are in each case below the heavy liquid discharge line. All of the discharge lines for the light and heavy liquid are trapped. In each of the above mentioned figures, the position of the light discharge lines would cause light liquid and emulsions to completely fill chamber 20 in FIG. 1 and chamber 6 in FIGS. 3 and 5 and extend down through the circulating lines, and some of the heaviest emulsions would be maintained in lower chamber 1. However, it will be observed that lowering the point of the light liquid discharge line below the fixed heavy discharge line would increase the amount of heavy liquid in the process of the separations, and decrease the amount of the light separated liquid at the top of chamber 20 in FIG. 1 and FIGS. 3 and 5.

The most desirable point at which to effect separation of the heavy impurity is shown in the upper chambers 20 and 6 by the dotted lines. For example, when the liquid discharge line is of sufficient length that the weight of the light liquid is equal to the weight of the liquid mixture in the process of separation to maintain the bottom of the separated light liquid at a point shown by the dotted line in the upper chambers. If a heavy liquid should be admitted through the supply line 2 the discharge from the light liquid line would gradually decrease and eventually stop. While, if we should admit through the supply line 2 light liquid only the light liquid would begin to discharge and the discharge from the heavy liquid line would begin to decrease and eventually stop. If we should admit a liquid mixture through the supply line 2, the lighter and heavier liquid would separate and the amount of light liquid and the amount of heavy liquid would discharge automatically from the separate discharge lines for the lighter and heavier liquid. It is therefore obvious that we provide in this instance automatic continuous or intermittent separation and maintain a considerable quantity of light and heavy separated liquid between the emulsions and impure liquid in the process of separation which would prevent the discharge of the impure liquid in the process of separation with either of the separated liquids. It is imperative that the discharge lines for the heavy liquid and the discharge lines for the light liquid shall have a capacity slightly greater than the supply line for the liquid mixture to maintain the function of the automatic discharge from the weight of the liquid in the separating process and not from pressure from the incoming liquid.

It will be observed in FIGURES 3 and 5 that since the lightest and warmest liquid in the lower chamber would pass through the circulating line to the upper chamber and the heaviest and coldest liquid in the upper chamber would collect at the bottom and pass downward through the circulating line to the lower chamber that automatic circulation of the lighter and heavier liquids to and from the upper and lower chambers would be continuous and this circulation would be accelerated by the action of the oil or grease passing upward through the circulating lines. This continuous circulating action does effect more perfect separation of the mixture. The emulsions separate completely and only the water, solids and impurities return to chamber 1.

I claim:

1. The method of separating mixed immiscible liquids having different specific gravities comprising segregating a body of the mixed liquids under atmospheric pressure to effect gravity stratification of the immiscible constituents of the mixture, effecting a convection movement of the stratified constituents by establishing an elevated body of the liquids not subject to atmospheric pressure and maintaining two separate columns of the liquids between the two bodies of different heights, the shorter column extending above the bottom of the upper body and the longer column extending from the bottom of the upper body downwardly to adjacent the bottom of the lower body whereby a shorter warmer column of liquids will rise to the upper body and a cooler column of the heaviest liquid will descend from the upper body to the lower body thereby effecting accumulation of the lighter gravity liquids at the top of the upper body.

2. The method of separating a flowing mixture of immiscible liquids having different specific gravities comprising decreasing the flow velocity of the mixture while segregating a body of the mixed liquids under atmospheric pressure to effect gravity stratification of the constituents of the mixture, effecting a convection movement of the stratified constituents by establishing an elevated body of the liquids not subject to atmospheric pressure and maintaining two separate columns of the liquids between the two bodies whereby a warmer column of liquids will rise to the upper body and a cooler column of the heaviest liquid will descend from the upper body to the bottom region of the lower body thereby returning the relatively heavy gravity liquids and precipitated solids from the bottom region of the upper body to the bottom region of the lower body.

3. The method of separating mixed immiscible liquids of varying temperature having different specific gravities comprising segregating a body of the mixed liquids under atmospheric pressure to effect gravity stratification of the immiscible constituents of the mixture, effecting a convection movement of the stratified constituents by establishing an elevated body of the liquids not subject to atmospheric pressure and maintaining two separate columns of the liquids between the two bodies, one column extending to the bottom of the upper body and the other column extending from the bottom of the upper body downwardly to adjacent the bottom of the lower body whereby a shorter warmer column of liquids will rise to the upper body and a cooler column of the heaviest liquid will descend from the upper body to the lower body thereby effecting accumulation of the lighter gravity liquids at the top of the upper body.

4. An apparatus for separating the constituents of a liquid influent composed of a mixture of high gravity and relatively low gravity liquids comprising an upper vessel sealed to the atmosphere, a lower vessel open to the atmosphere, two pipe lines establishing hydrostatically sustained liquid columns extending between the two vessels, one of said lines extending from the inner upper region of the lower vessel and a floating skimmer means disposed about the lower end of said one line and arranged to gather the low gravity liquids about the bottom region of said one line.

5. In devices of the character described an upper liquid separator vessel, a lower liquid separator vessel, said lower vessel being open to the atmosphere and said upper vessel being sealed to the atmosphere and adapted to be filled completely with liquid, a riser pipe extending between the lower and upper vessels with the top of the riser pipe leading to the bottom region of the upper vessel and the lower end of the pipe terminating below a static liquid level in the lower vessel, a draw-off line terminating at the top thereof adjacent the top of the upper vessel and the bottom thereof below the static liquid level in the lower vessel thereby to establish a hydrostatically balanced draw-off column, said lower vessel having an outlet leg establishing the normal static level in the lower vessel above the lower end of the riser pipe in said last named vessel and a return pipe extending downwardly from the upper vessel to the bottom region of the lower vessel.

6. An apparatus for separating the constituents of a mixture formed of lighter and relatively heavier immiscible substances comprising an upper and a lower vessel connected by a hydrostatic column structure, said column structure extending from below the liquid level of the lower vessel to the lower region of the upper vessel, said lower vessel being open to atmospheric pressure and serving to retain influent while stratification of the influent components takes place and said upper vessel being sealed against atmospheric pressure and adapted to be filled completely with separated liquids, a second hydrostatic column structure communicating with the top region of the upper vessel and extending downwardly below the top region of the retained fluid in the lower vessel and having a trap means at the bottom thereof disposed exteriorly of the two vessels whereby the two columns can be sustained within the column structures and a third column structure extending from the bottom of the upper vessel to the bottom region of the lower vessel.

7. An apparatus for separating the constituents of a liquid mixture composed of a mixture of high gravity and relatively low gravity liquids comprising an upper vessel sealed to the atmosphere and adapted to be filled completely with separated liquids, a lower vessel open to the atmosphere and having a riser outlet leg determining the static liquid level in the lower vessel, three separate column structures adapted to sustain three hydrostatic columns, one of said structures extending from below the liquid level of the lower vessel to the bottom region of the upper vessel and another column structure extending downwardly from the upper region of the upper vessel exteriorly of the lower vessel and terminating in a trap structure disposed below the bottom terminus of the first described column structure and the third column structure leading downwardly from the bottom of the upper vessel and terminating in the bottom of the lower vessel adjacent the bottom of the outlet riser leg of the lower vessel.

8. An apparatus for separating the constituents of a liquid mixture composed of a mixture of high gravity and relatively low gravity liquids comprising an upper vessel sealed to the atmosphere, a lower vessel open to the atmosphere, two hydrostatically sustained liquid columns in two separate column structures, one of said structures extending from the inner upper region of the lower vessel to the bottom region of the upper vessel, and a floating skimmer means at the lower end of the last named column structure, said other column structure extending downwardly from the upper region of the upper vessel exteriorly of the lower vessel and terminating in a trap structure.

9. The method of separating mixed liquids having different specific gravities comprising first arranging an upper and a lower body of water with the lower body subject to atmospheric pressure and the upper body sealed to the atmosphere, establishing a hydrostatic column to extend between the two bodies of water with the lower end of the column arranged to extend below the static liquid level of the top of the lower liquid body, establishing a trapped balanced discharge column communicating with the upper body near the top thereof and extending downwardly to a point below the normal static level of the lower body and open to atmospheric pressure at the bottom thereof, and passing an influent comprising a mixture of relatively high and low gravity liquids into the lower body of water whereby the mixture will separate in the lower body of water and the low gravity liquid will pass up said hydrostatic column and displace a substantially equal volume of water downwardly in said hydrostatic column and continuing the flow of influent to the lower body until a flow of low gravity liquid through the balanced discharge column is produced.

10. In devices of the character described an upper liquid separator vessel adapted to be filled completely with separate liquids, a lower liquid separator vessel having an inlet, said inlet opening to the lower vessel below the static liquid level therein and opening externally above the static liquid level, said inlet being open to the atmosphere and said upper vessel being sealed to the atmosphere, a riser pipe comprising a hydrostatic column extending between the lower and upper vessels with the top of the riser pipe leading to the bottom region of the upper vessel and the lower end of the pipe terminating below the top of the static liquid level in the lower vessel, an open discharge line terminating at the top thereof adjacent the top of the upper vessel and the bottom thereof being trapped below the static liquid level of the lower vessel and open to the atmosphere outside of the lower vessel thereby to establish a balanced hydrostatic column with respect to the riser pipe, and said lower vessel having an outlet leg establishing the normal static level in the lower vessel above the lower end of the riser pipe in said last named vessel.

11. In devices of the character described an upper liquid separator vessel, a lower liquid separator vessel, said lower vessel having an inlet pipe opening thereinto below the static liquid level in the lower vessel, said pipe being open to the atmosphere and said upper vessel being sealed to the atmosphere and adapted to be filled completely with separated liquids, heavy liquid outlet means for the lower vessel establishing said static liquid level in the lower vessel, a riser pipe comprising a hydrostatic column extending between the lower and upper vessels with the top of the riser pipe leading to the bottom region of the upper vessel and the lower end of the pipe terminating below the static liquid level of the lower vessel, a draw-off line terminating at the top thereof adjacent the top of the upper vessel and the bottom thereof open to the atmosphere below the static liquid level of the lower vessel thereby to establish a hydrostatic column balanced with respect to the riser column, and said lower vessel being vented to the atmosphere.

12. The method of separating mixed liquids having different specific gravities comprising first arranging an upper and a lower body of water with the lower body subject to atmospheric pressure and the upper body sealed to the atmosphere, establishing a hydrostatic column to extend between the two bodies of water with the lower end of the column arranged to extend below the static liquid level of the top of the lower liquid body, establishing an atmospherically balanced draw-off column communicating with the upper body near the top thereof and extending downwardly to a point below the normal static level of the lower body, passing an influent comprising a mixture of relatively high and low gravity liquids into the lower body of water whereby to stratify the mixture into the components thereof and the low gravity stratums of liquid will pass up said hydrostatic column and displace a substantially equal volume of water downwardly in said hydrostatic column, continuing the flow of influent to the lower body until a flow of low gravity liquid is drawn off through the balanced draw-off column and adding fresh water to the separated water in the lower body of water during continuous flow of the influent into the lower body of liquids.

References Cited in the file of this patent

UNITED STATES PATENTS

| | | |
|---|---|---|
| 266,204 | Roeckner | Oct. 17, 1882 |
| 952,620 | Keyes | Mar. 22, 1910 |
| 1,045,811 | Buhring | Dec. 3, 1912 |
| 1,079,398 | Coakley | Nov. 25, 1913 |
| 1,232,370 | Morison | July 3, 1917 |
| 1,513,882 | Bateman | Nov. 4, 1924 |
| 1,895,276 | Cole | Jan. 24, 1933 |
| 1,902,288 | McGinnis | Mar. 21, 1933 |
| 1,923,557 | Schmidt | Aug. 22, 1933 |
| 2,179,919 | Carr | Nov. 14, 1939 |
| 2,214,248 | Hawley | Sept. 10, 1940 |
| 2,405,705 | Mobley | Aug. 13, 1946 |
| 2,410,633 | Counselman | Nov. 5, 1946 |

FOREIGN PATENTS

| | | |
|---|---|---|
| 22,324 | Sweden | Apr. 27, 1907 |